June 12, 1962 T. F. DOUMANI 3,038,843
DISTILLATION PROCESS AND APPARATUS
Filed Aug. 30, 1957

INVENTOR.
THOMAS F. DOUMANI,
BY
Lammas S. Henderson
AGENT.

United States Patent Office 3,038,843
Patented June 12, 1962

3,038,843
DISTILLATION PROCESS AND APPARATUS
Thomas F. Doumani, Whittier, Calif., assignor to Union Oil Company of California, Los Angeles, Calif., a corporation of California
Filed Aug. 30, 1957, Ser. No. 681,342
5 Claims. (Cl. 204—154)

This invention relates to methods for fractionating liquids, particularly hydrocarbon oils, for the purpose of separating a relatively volatile component from a relatively less volatile component. The invention is concerned specifically with fractional distillation processes wherein the overhead product, as conventionally recovered, contains undesirable volatile contaminants which render the distillate unstable in some one or more respects. Such instability may result in the deterioration of the distillate by the formation of polymers, gums, discoloring bodies, malodorous products and the like. The volatile contaminants may either be present as such in the original feed and/or they may be a product of the distillation itself, i.e. they may be generated at the distillation temperature as a result of thermal decomposition. According to the present invention, these contaminants are conveniently and economically eliminated from the distillate by providing at one or more points in the fractionation zone a source of ionizing radiation, as e.g. the radiations from radioactive isotopes. Such radiations selectively activate the relatively unstable contaminant molecules and convert them to less volatile polymers, which are then fractionated downwardly and removed as bottoms, either per se, or in admixture with other heavy fractions of the feed.

Broadly, therefore, the principal object of the invention is to provide simple and convenient measures for producing desirably stable distillates in all cases where such distillates are normally unstable in some one or more respects. A more specific object is to provide distillation methods for the fractionation of mineral oils whereby distillates of improved gum stability may be obtained. A further object is to provide means for eliminating polymer-forming materials from hydrocarbon distillates. Still another object is to improve high-temperature distillation processes which normally result in the pyrolysis of certain feed components to produce relatively more volatile polymer-forming materials, whereby such volatile polymer-forming materials are eliminated from the distillate fractions. Another object is to provide suitable radioactive sources and apparatus for effecting the foregoing objects. Other objects and advantages will be apparent from the more detailed description which follows.

In the fractional distillation of hydrocarbon oils, particularly high-boiling oils such as gas oils, crude oils, reduced crude oils and the like, where temperatures in the reboiler may be as high as about 600°–1000° F., a certain amount of thermolytic decomposition of the heavier components normally occurs. The products of this undesirable cracking comprise mainly olefins, diolefins, polyolefins, complex nitrogen compounds, sulfur compounds and the like. These cracking products will normally be sufficiently volatile to be in part carried over into the overhead fractions. For example, in the distillation of crude oils for the recovery of gas oils to be used as catalytic cracking feedstock, a considerable proportion of these undesirable cracked products will be carried over into the distillate gas oil. When this distillate is employed as feed to a catalytic cracking zone, the unstable contaminants tend to polymerize and form gums which result in accelerated fouling and coking of the catalyst. It would therefore be highly desirable to eliminate such coke-forming precursors from catalytic cracking charge stocks.

Another instance of utility will be found in the recovery of stable cracked gasolines from the total products of cracking. The cracked gasoline which is recovered by distillation contains a high proportion of mono-olefins together with much smaller proportions of diolefins and polyolefins. These diolefins and polyolefins can result in poor stability of the gasoline with respect to gum formation. Organic nitrogen compounds are also suspected of playing a part in such gum formation. For these reasons, cracked gasolines must normally be acid treated, clay treated or otherwise treated to improve their stability. According to the present invention, the initial distillation may be conducted in the presence of a controlled degree of radiation, so as to polymerize selectively the unstable components, e.g. nitrogen compounds and polyolefins, without appreciably affecting the more stable mono-olefins. The polymers produced are then fractionated downwardly in the column and recovered in the bottoms product. The total bottoms product may then be recycled to the cracking zone, or it may be further fractionated in the presence of a suitable radiation source to recover an overhead fraction suitable for recycle to the cracking zone.

In the drawings, FIGURE 1 represents schematically a conventional fractional distillation column wherein preferred zones of radioactivity are illustrated.

Figure 1:
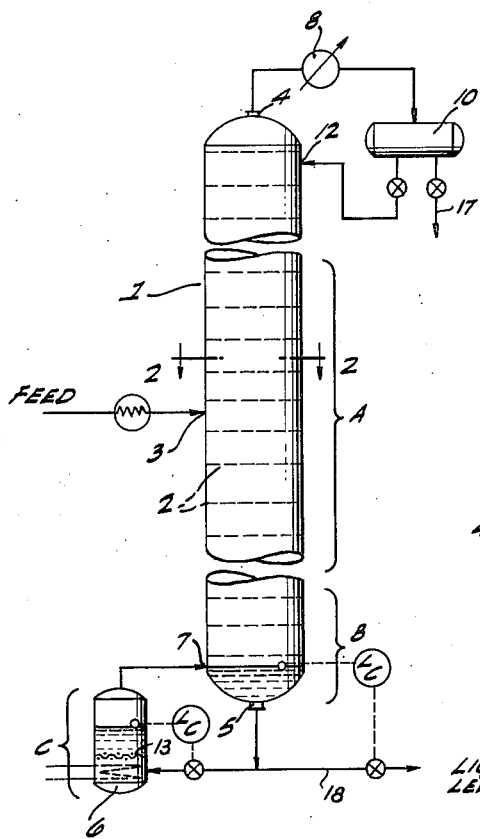

As will appear from FIGURE 1, the sources of radioactivity may be located at substantially any desired point or points in the column with the exception of the topmost plates thereof. For various applications the optimum location of the radiation source will vary. For example, where the feed already contains some volatile, polymer-forming material, it will be preferable to locate at least a part of the radiation source near the feed inlet port. Sources of radiation may be distributed for example in or near the first one to ten plates above the feed inlet, and if desired in the first one to ten plates below the feed inlet. Depending upon the feed being fractionated, and the size of the column, it will be preferable to leave the topmost one to twenty plates free of activating radiation. This is to insure that adequate fractionating capacity will be provided to effect separation of any polymers formed as a result of the radiation.

Locating the source of radiation near the feed inlet as above described is also desirable in those cases where thermolytic decomposition occurs during fractionation, as for example in the reboiler. Normally, there will be a temperature gradient of at least about 50°–200° F. from the top to the bottom of the column. It will therefore be apparent that more thermal decomposition will occur in the bottom portions of the column and in the reboiler than will occur in the upper portions of the column. Since ionizing radiations can also increase thermal decomposition, it will be preferable in these cases to place the source of radiation in the coolest portions of the fractionating zone consistent with adequate separation of polymers from the overhead. Where thermal decomposition occurs therefore it will usually be desirable to place the radiation near or slightly above the feed inlet, and to maintain the reboiler and lower sections of column free of radiation.

In cases where the initial feedstock is free of volatile polymer-formers, and where the thermal decomposition which occurs during distillation is relatively insensitive to the ionizing radiations, it may be preferable to locate the major source of radiation in the reboiler or in the lower sections of the column. This modification may be particularly desirable for example in the distillation of naphthas where it is desired to recover a light naphtha distillate (B.P. 100°–350° F.) and a heavy naphtha (B.P. 250°–450° F.) as bottoms. By locating the source of radiation in the hottest zones of the column, the combined polymerizing effect of heat and radiation is obtained, whereby the intensity of the radiation may be decreased.

In any of the foregoing modifications, the source of radiation may be disposed in many different ways. Where the source is predominantly a gamma ray emitter, a relatively concentrated source may be employed. For example, adequate saturation may be obtained by disposing three or four vertical rods of a gamma ray emitter such as cobalt-60 within the distillation zone. Alternatively, an external source of radiations may be employed. In either event those skilled in the art will readily appreciate that when gamma ray emitters are employed suitable shielding must be employed to protect the operators.

Where the source of radiation is predominantly a beta ray emitter, the much shorter range of this radiation as compared to gamma radiation, makes desirable a more even subdivision and dispersion of the source. Various specific means for obtaining this object will be described hereinafter in connection with the drawings.

In any case, it is preferable to use a radiation source which is non-volatile, stable and not subject to corrosion, and one which is easily removed from the distillation equipment to facilitate cleaning and repairs.

Suitable sources of radiation include for example radioactive isotopes produced by neutronic bombardment in a nuclear pile, fission products from nuclear piles, isotopes produced by bombardment in particle accelerators, and the emanations themselves from particle accelerators. Any effective ionizing radiation, however produced, may be employed. Such radiations may consist of or comprise alpha rays, beta rays, gamma rays, neutrons, and the like.

Where radioactive isotopes are employed it is preferable that they be used in elemental form rather than as chemical compounds. The pure radioactive isotopes may be used, but they are normally unnecessarily expensive and hence not preferred. Isotopic concentrates ranging in specific activity from about 1 to 1000 curies per gram are preferred. These isotopic concentrates will normally be shaped into the desired form and then coated with a suitable inert element such as gold in order to resist chemical attack. Suitable physical forms in which they may be employed are as rods, bars, screens, grids of varying dimensions, billets, pellets, tubes, sheets, plates, and the like. These structural elements are preferably fastened securely within the desired fractionating zone by bolts, rivets, weldments, clamps or the like. Alternatively, various structural elements of the fractionating equipment itself may be fabricated from the isotopic concentrates. Suitable elements include for example the plates, caps, risers, downspouts, tubes and the like. It is preferable however, in view of the cost of isotopic concentrates, to employ them as separate units apart from the fractionating equipment. It is also preferable to secure such units to the fractionation equipment in such manner as to avoid contact with any moving parts such as bubble caps which might cause mechanical wear, resulting in the appearance of radioactive particles in the product streams.

Various modifications in which the radioactive elements may be employed are illustrated in the drawings. The over-all picture is provided in FIGURE 1 which illustrates a conventional distillation column. The column 1 is constructed of iron or steel, or other conventional material and contains a series of plates 2 which may be conventional bubble cap plates, baffle plates, perforated plates, or any other conventional type of fractionating tray. A feed inlet 3 is provided as well as an overhead outlet 4, a bottoms outlet 5, a reboiler 6, a bottoms reflux inlet 7, an overhead condenser 8, an overhead condensate collector 10, and an overhead reflux inlet 12. Bracket A illustrates the preferred zones for location of the radioactive source where the feed itself contains volatile polymer-formers, and/or where the distillation process is radio-sensitively thermolytic. Brackets B and C illustrate the preferred zones for location of the radiation source where the feed neither contains volatile polymer-formers nor is subject to radio-sensitive thermolytic decomposition. In zone C, a suitable radioactive screen 13, is indicated, which may be similar to screen 20 in FIGURE 2. The operation of fractionating column 1 need not be described in detail since it is conventional, the net overhead product being withdrawn through line 17, and the net bottoms product through line 18.

Figure 2:
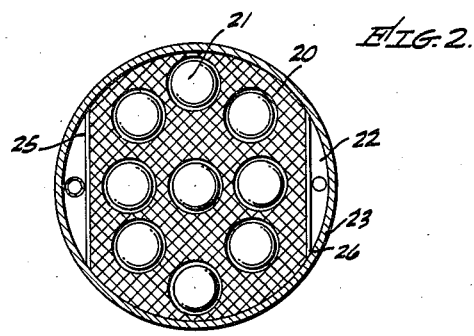
FIGURE 2 represents a cross section taken along line 2—2 of FIGURE 1 and illustrates one specific modification of radioactive element which may be employed.

FIGURE 2 illustrates the use of a radioactive screen supported within one of the column trays. This screen 20 is preferably of rather course mesh, e.g. about 1–20, and is preferably cut in such shape as to fit into the top of each tray with a space of about ½-inch to two inches separating it from the outer periphery of the bubble caps 21. Screen 20 may be fastened to the plate 22 by means of suitable bolts and spacing washers, or it may be attached to the column shell 23 by any suitable means, and/or to the plate inlet weir 25 and the plate outlet weir 26. Preferably screen 20 is spaced slightly upwardly from plate 22 in such manner as to be about equidistant from the top of tray 22 and the liquid level in the tray. This form of radioactive element is preferred where the source of radiation is mainly a beta emitter, hence requiring a relatively homogeneous distribution. It is not essential that each strand of the screen 20 be composed of the radioactive element. The number of radioactive strands to be employed depends upon the intensity of radiation desired, and the strength of the emitter.

Figure 3:
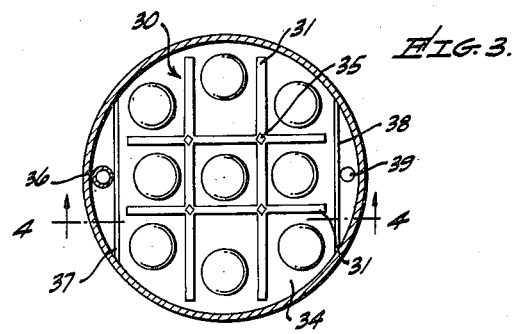
FIGURE 3 is a variation of FIGURE 2, illustrating a slightly different form of radioactive element.
Figure 4:
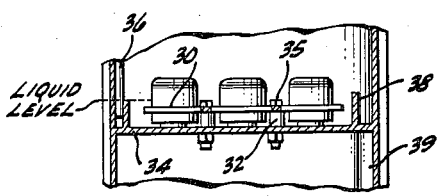
FIGURE 4 is a cross section taken along line 4—4 of FIGURE 3, illustrating the position of a radioactive element with respect to the liquid level on one of the plates of the distillation column.

FIGURES 3 and 4 illustrate a slightly different modification of radioactive element for use in a fractionating tray. The radioactive element consists of a metallic grid work 30 composed of transverse bars 31. These bars are preferably thin and flat in order to obtain the most efficient geometric configuration of the source. They may range in size for example from about one to five inches in width and 1/64-inch to 1/8-inch in thickness, although other dimensions are not excluded. As illustrated, this grid work is attached to plate 34 by means of bolts 35 and spacing sleeves 32. The flow of liquid is from downspout 36, over inlet weir 37, across plate 34 and bars 31, then over outlet weir 38 and through downspout 39.

FIGURE 4 simply illustrates more specifically the position of grid work 30 with respect to plate 34 and the liquid level in the tray. This form of radiation source is suitable for use with either beta emitters or gamma emitters, or mixed beta-gamma emitters.

Manifestly, the details of construction of the radiation source, and its manner of affixation are not critical herein and it is not intended to restrict the invention to any of the exemplary details above described.

Where radioactive isotopes are employed, it is preferred to use those isotopes which are predominantly or wholly beta ray emitters. Specifically, it is preferred to use those isotopes in which at least 20% of the total radiation energy is in the form of beta rays. The maximum energy levels of the radiations should range between about 0.001 and 3.0 mev., and preferably between about 0.05 and 2.0 mev. Examples of suitable isotopes which may be employed herein are illustrated in the following table. These isotopes are preferably employed in the form of mixtures with other inert isotopes of the same element or others.

RADIATION ENERGY

| Isotope | Half-life | $\beta$, Mev. | $\gamma$, Mev. | Specific Activity, Curies/Gram Pure Isotope |
|---|---|---|---|---|
| $Ca^{45}$ | 152 d | 0.255 | | $1.91 \times 10^4$ |
| $Ce^{144}$ | 290 d | 0.35 | 0.03-0.134 | $0.313 \times 10^4$ |
| $Cs^{137}$ | 33 y | 0.52-1.17 | 0.66 | 79.3 |
| $Ni^{63}$ | 85 y | 0.067 | | 66.6 |
| $Pm^{147}$ | 2.6 y | 0.223 | | 944 |
| $Ru^{106}$ | 1 y | 0.0392 | | $0.339 \times 10^4$ |
| $Sr^{90}$ | 25 y | 0.61 | | 159 |
| $Sr^{89}$ | 53 d | 1.46 | | $2.78 \times 10^4$ |
| $Co^{60}$ | 5.25 y | 0.31 | 1.17-1.33 | $0.114 \times 10^4$ |
| $Sc^{46}$ | 85 d | 0.36-1.2 | 0.89-1.12 | $3.35 \times 10^4$ |
| $Ag^{110}$ | 270 d | 0.09-2.12 | 0.65-0.94 | $0.442 \times 10^4$ |
| | | 0.57-2.86 | 0.90-1.54 | |
| $S^{35}$ | 87 d | 0.167 | | $4.27 \times 10^4$ |
| $Tl^{204}$ | 3 y | 0.77 | | 596 |
| $W^{185}$ | 73 d | 0.43 | | $0.97 \times 10^4$ |
| $Y^{91}$ | 59 d | 1.56 | | $2.44 \times 10^4$ |

It is conventional in the technique of radiation applications to define the operative radiation concentrations in terms of the amount of energy absorbed by the material being irradiated. A convenient measure of such energy absorption is the rep, which is equivalent to 93 ergs per gram of material irradiated. For purposes of the present invention, energy absorption levels ranging between about 10 reps and $26 \times 10^9$ reps may be utilized, preferably between about $10^2$ and $10^8$ reps.

It is not possible to prescribe any exact formula for determining the amount of radiation to employ to obtain the desired effect on the feed. This must be determined experimentally with each feedstock being treated, inasmuch as the different components of the feed will display different susceptibilities to radiation. In general, the best procedure to follow in designing a given radiation source for a specific application is as follows: First, several samples of the feed are irradiated at different energy absorption levels to determine (by standard dosimetry methods) the optimum absorption required to effect the desired chemical changes in the feed. Then, with the feed rate established, the total amount of radiation energy required per unit of time may be calculated. From these data, the radiation source may be selected and designed to generate the necessary radiation energy at optimum efficiency.

A given quantity of radiation absorption can be obtained in many different ways, depending upon the energy of the radiations, the isotopic content of the source, and its geometrical distribution. In general, the most efficient utilization of the source is obtained where it is homogeneously distributed throughout the desired zones, and is attenuated in a form presenting a maximum ratio of exterior surface area to total mass thereof. Where a source of low surface area to mass ratio is employed, a relatively larger proportion of the radiation will be absorbed internally and dissipated as heat or as other undesirable forms of energy. This is especially true in the case of beta emitters.

When treating feedstocks containing two or more components which are relatively sensitive to the effects of radiation, and where it is desired to effect polymerization of only one of those components, it will be desirable to control the radiation dose so as to obtain a more selective action upon the component having the highest sensitivity to radiation. This condition may occur for example in the distillation of cracked gasolines, where it is desired to effect polymerization of undesirable polyolefins and/or nitrogen compounds without affecting the mono-olefins. For purposes of this sort, the radiation dose should preferably be controlled to provide absorption levels of about $10^1$ to $10^4$ reps. Conversely, where the feed contains only one relatively sensitive component, the radiation dose is not so critical; any amount may be used which is at all effective, up to maximum dosages which would begin to effect more fundamental chemical changes such as dehydrogenation, cracking and the like.

The following examples are cited to illustrate certain applications of the invention, but are not intended to be limiting in scope.

Example I

A sample of the total cracked product from a commercial catalytic cracker is first distilled to remove heavy cycle oil, and the overhead is then redistilled in a 30-plate Oldershaw column at 20/1 reflux ratio to recover a 100°–450° F. boiling range gasoline, and a light cycle oil bottoms product boiling between about 350° and 500° F. The product gasoline is produced at the rate of about 120 ml./hr., and contains about 0.005% nitrogen, 0.5% sulfur, and has a diolefin content of about 1%. After a light acid wash, the gasoline is found to produce 10 mg. of gum per liter when subjected to a standard I.S.D. (induction system deposit) gum test. In this test, 3 liters of gasoline are evaporated continuously over a two-hour period in a glass column at 200° F. countercurrently to a rising air stream. The dry column is then rinsed with acetone and the dissolved gum content is determined.

When the above gasoline-fractionation step is repeated in the same 30-plate column, modified by inserting a two-inch washer of a nickel-63 concentrate (3000 curies) on plate Nos. 10, 11, 12 and 13 from the top of the column, the gasoline recovered is found to contain less nitrogen and sulfur, and has a lower diolefin content. The I.S.D. gum is found to be less than 5 mg. per liter, and the product is hence of acceptable stability.

Example II

A reduced Los Angeles basin crude oil is distilled in the 30-plate Oldershaw column to recover first the 450° end point gasoline, and the residue is further distilled at 10/1 reflux ratio to recover overhead, at the rate of about 200 ml./hr., a gas oil fraction boiling between about 400° and 800° F. This gas oil is then subjected to catalytic cracking in a midget fluid catalytic cracker at 950° F., 0 p.s.i.g., and a catalyst/oil ratio of 0.75. The initial conversion to 450° F. end point gasoline is about 40%, and the yield drops off to about 25% after 12 hours. The catalyst after this period is found to contain 5.6% of coke.

Another sample of the 400°–800° F. gas oil is similarly prepared by fractionation in the same 30-plate column, modified by inserting two gold-clad one-inch washers of a cobalt-60 concentrate (2000 curies each) on the 12th and 13th plates of the column, appropriate exterior shielding being provided. Upon subjecting this gas oil to fluid catalytic cracking under the same conditions as above, the 450° F. end point gasoline yield after 12 hours is about 35%, and the catalyst contains less than 2% of coke. The superior stability of the irradiated oil is obvious.

Many modifications may be made in the details described above, as will be evident to those skilled in the art, and all such modifications are intended to be included herein. The true scope of the invention is intended to be defined by the following claims.

I claim:

1. In a distillation process wherein a hydrocarbon feedstock is introduced at an intermediate point in a multistage fractionating column including a bottoms reboiler, and is subjected to rectification therein to recover a relatively volatile overhead fraction and a less volatile bottoms fraction, and wherein the temperature in said reboiler is maintained at pyrolytic temperatures above about 600° F. whereby volatile, polymer-forming decomposition products are produced and normally distilled overhead resulting in an unstable distillate, the improvement which comprises subjecting said feedstock while fractionating the same to intense ionizing radiation in the midsection of said column, said reboiler and the topmost and bottommost distillation zones in said fractionating column being maintained free of radiation, thereby converting said volatile decomposition products to less volatile polymers, and fractionating said polymers downwardly and removing the same with said bottoms fraction, said radiation being of maximum energy level in the 0.001 to 3 mev. range and constituting the sole extraneous activator for promoting said conversion of volatile constituents to less volatile polymers.

2. A process as defined in claim 1 wherein said feedstock is essentially a crude oil, and said overhead product is a gas oil.

3. A process as defined in claim 1 wherein said feedstock is a cracked oil fraction, and said overhead product is a cracked gasoline fraction boiling between about 100° and 450° F.

4. A fractional distillational column comprising in combination an elongated outer shell, an upper outlet therefrom adapted to discharge distillate, a heating element operatively associated with the bottom portion of said shell, an intermediate inlet port adapted to admit feed to said column, a series of transverse rectifying plates supported within said shell and disposed between said heating element and said upper outlet, and removably affixed to a structure within said outer shell a body of a radioactive metallic concentrate capable of emitting radiation of maximum energy level in the 0.001 to 3 mev. range, said radioactive metallic concentrate being in the form of an attenuated structure disposed horizontally across at least one of said plates and spaced slightly above the upper surface of said plate but below the upper edge of its associated overflow weir, at least the topmost of said plates being free of radioactive material.

5. An apparatus as defined in claim 4 wherein said radioactive metallic concentrate is predominantly a beta emitter.

References Cited in the file of this patent

UNITED STATES PATENTS

| | | |
|---|---|---|
| 516,154 | Ellis | Mar. 6, 1894 |
| 1,629,938 | Tingley | May 10, 1927 |
| 1,954,867 | Egloff | Apr. 17, 1934 |
| 2,107,713 | Rowland et al. | Feb. 8, 1938 |
| 2,686,150 | Porter et al. | Aug. 10, 1954 |
| 2,698,287 | Bowden et al. | Dec. 28, 1954 |
| 2,845,388 | Black et al. | July 29, 1958 |
| 2,872,396 | Wilson et al. | Feb. 3, 1959 |